MAGNETIC AMPLIFIERS

Filed Sept. 15, 1953 2 Sheets-Sheet 1

WITNESSES:
E. A. McCloskey
K. W. Thomas

INVENTORS
Franklin S. Malick
and Frederick G. Timmel.
BY
Ezra W. Savage
ATTORNEY WITNESSES:
E. A. McCloskey
K. W. Thomas INVENTORS
Franklin S. Malick
and Frederick G. Timmel.
BY
Ezra W. Savage
ATTORNEY United States Patent Office 2,795,652

Patented June 11, 1957

2,795,652

MAGNETIC AMPLIFIERS

Franklin S. Malick, Milwaukee, Wis., and Frederick G. Timmel, Baltimore, Md., assignors to Westinghouse Electric Corporation, East Pittsburgh, Pa., a corporation of Pennsylvania Application September 15, 1953, Serial No. 380,336

2 Claims. (Cl. 179—171)

This invention relates to push-pull magnetic amplifiers, and, more particularly, to temperature compensating means for such push-pull magnetic amplifiers.

In order to obtain the widest possible range of linear output from a push-pull magnetic amplifier, having two sections, each of the sections of the magnetic amplifier should be biased to approximately ½ of its maximum output, the output voltages of the two sections being bucked against each other in order to produce zero output with zero control signal being applied to the push-pull magnetic amplifier. However, if the reactor or rectifier characteristics of the two sections of the push-pull magnetic amplifier change with temperature, thus changing the gain or bias point, then the two sections will no longer be biased to the ½ maximum output point. This results in a reduced range of linearity for the push-pull magnetic amplifier, which can be very serious in many applications.

Not only do temperature changes effect a shift in the operating point of each of the two sections of the push-pull magnetic amplifier, but if fixed bias is used, changes in the magnitude of the bias voltage as applied to the bias windings of the push-pull magnetic amplifier also effect a shift in the operating point of each of the two sections of the push-pull magnetic amplifier.

An object of this invention is to provide for compensating for variations in the core materials and rectifiers of a push-pull magnetic amplifier that occur with changes in the temperature of the air surrounding the magnetic amplifier, by automatically adjusting the bias of the two sections of the magnetic amplifier in accordance with the sum of the output currents of the two sections to provide a feedback control loop for the bias.

Another object of this invention is to provide for obtaining the widest possible range of linear output from a balanced push-pull magnetic amplifier, having two sections, even though the temperature of the air surrounding the magnetic amplifier changes, by automatically adjusting the bias of the two sections of the magnetic amplifier in accordance with the sum of the output currents of the two sections.

Other objects of this invention will become apparent from the following description when taken in conjunction with the accompanying drawings, in which.

Figure 1:
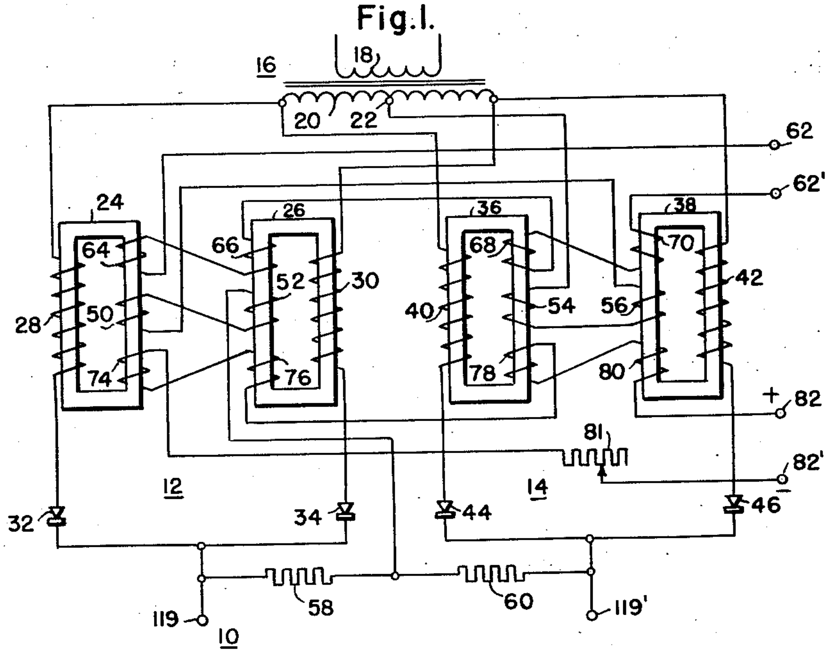
Figure 1 is a schematic diagram of apparatus and circuits illustrating an embodiment of the teachings of this invention.

Referring to Fig. 1, this invention is illustrated with reference to a balanced push-pull magnetic amplifier 10, having two sections 12 and 14, which receive energy from a center tapped transformer 16. As illustrated, the center tapped transformer 16 comprises a primary winding 18 and a secondary winding 20 having a tap 22 intermediate its two ends.

In this instance, the section 12 is a full-wave self-saturating magnetic amplifier, and comprises rectangular core members 24 and 26, constructed of rectangular loop core material. The core members 24 and 26, in turn, have load windings 28 and 30, respectively, disposed in inductive relationship therewith. In order to permit current to flow in only one direction through the load windings 28 and 30, self-saturating rectifiers 32 and 34 are connected in series circuit relationship with the load windings 28 and 30, respectively.

The section 14 of the push-pull magnetic amplifier 10 is likewise a full-wave self-saturating magnetic amplifier, and comprises magnetic core members 36 and 38, also constructed of rectangular loop core material. In this instance, load windings 40 and 42 are disposed in inductive relationship with the core members 36 and 38, respectively. In order to permit the flow of current in only one direction through the load windings 40 and 42, self-saturating rectifiers 44 and 46 are connected in series circuit relationship with the load windings 40 and 42, respectively.

In order to energize the load winding 30 and 42, of the sections 12 and 14, respectively, one end of the secondary winding 20 of the transformer 16 is connected to one end of the series circuit including the load winding 30 and the rectifier 34 and to one end of the series circuit including the load winding 42 and the rectifier 46. On the other hand, in order to energize the load windings 28 and 40 of the sections 12 and 14, respectively, the other end of the secondary winding 20 is connected to one end of the series circuit including the load winding 28 and the rectifier 32 and to one end of the series circuit including the load winding 40 and the rectifier 44.

In accordance with the teachings of this invention, self-biasing windings 50, 52, 54, and 56 are disposed in inductive relationship with the magnetic core members 24, 26, 36 and 38, respectively, in order to compensate for variations in the core materials of the core members 24, 26, 36 and 38 and for variations in the rectifiers 32, 34, 44 and 46 of the push-pull magnetic amplifier 10, that occur with changes in the temperature of the air surrounding the magnetic amplifier 10. As illustrated in this modification, the biasing windings 50, 52, 54 and 56 are connected in series circuit relationship with one another.

Further, in accordance with the teachings of this invention, the series connected bias windings 50, 52, 54 and 56 are energized in accordance with the sum of the output currents of the sections 12 and 14 of the push-pull magnetic amplifier 10. In particular, the series circuit including the bias windings 50, 52, 54 and 56 is connected between the tap 22 on the secondary winding 20 of the transformer 16 and the junction point of load resistors 58 and 60. As can be seen from Fig. 1, the other end of the load resistor 58 is connected to the junction point of the rectifiers 32 and 34 of the section 12, and the other end of the load resistor 60 is connected to the junction point of the rectifiers 44 and 46 of the section 14 of the push-pull magnetic amplifier 10. The self-bias windings 50, 52, 54 and 56 are so interconnected and disposed on their respective magnetic core members that when a current proportional to the sum of the output currents of the sections 12 and 14 flows through these self-bias windings a flux is produced in the respective magnetic core members that opposes the flux produced by the current flow through the associated load windings. Thus, the self-bias windings 50, 52, 54 and 56 produce a negative bias.

In order to control the magnetic saturation of the core members 24, 26, 36 and 38 in accordance with the polarity and magnitude of a direct-current control signal applied to terminals 62 and 62', control windings 64, 66, 68 and 70 are disposed in inductive relationship with the core members 24, 26, 36 and 38, respectively. In particular, the control windings 64, 66, 68 and 70 are connected in series circuit relationship with one another, the series circuit being connected across the terminals 62 and 62'. As is customary in a push-pull magnetic amplifier, the control windings 64, 66, 68 and 70 are so disposed and interconnected that when current flows in a given direction through these control windings, the section 12 is driven up and the section 14 is driven down. When the direction of current flow through the control windings 64, 66, 68 and 70 is reversed, the section 14 is driven up and the section 12 is driven down.

For the purpose of more accurately compensating for variations in the core materials of the core members 24, 26, 36 and 38 and for variations in the rectifiers 32, 34, 44 and 46 of the push-pull magnetic amplifier 10 due to changes in the temperature of the air surrounding the magnetic amplifier 10, external-bias windings 74, 76, 78 and 80 are disposed in inductive relationship with the core members 24, 26, 36 and 38, respectively. In this instance, the external bias windings 74, 76, 78 and 80 are connected in series circuit relationship with one another, and with an adjustable resistor 81, the series circuit being connected across terminals 82 and 82' which have applied thereto a substantially constant direct-current voltage. By providing the adjustable resistor 81 the magnitude of the current flow through the external-bias windings 74, 76, 78 and 80 can be varied. As illustrated, the external-bias windings 74, 76, 78 and 80 are so disposed on their respective core members 24, 26, 36 and 38 that when the voltage applied to the terminals 82 and 82' is of the polarity as shown in Fig. 1, the current flow through these external-bias windings 74, 76, 78 and 80 produces a flux in the core members 24, 26, 36 and 38, respectively, that aids the flux produced by the current flow through the associated load windings 28, 30, 40 and 42, respectively. Thus, in operation the external-bias windings 74, 76, 78 and 80 produce a positive bias.

Figure 2:
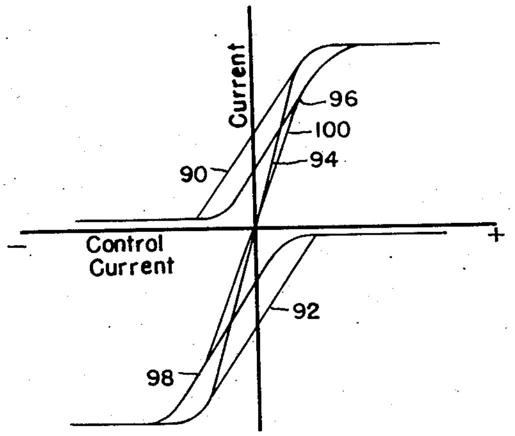
Figs. 2 and 3 are graphs illustrating the operation of the apparatus illustrated in Fig. 1.
Figure 3:
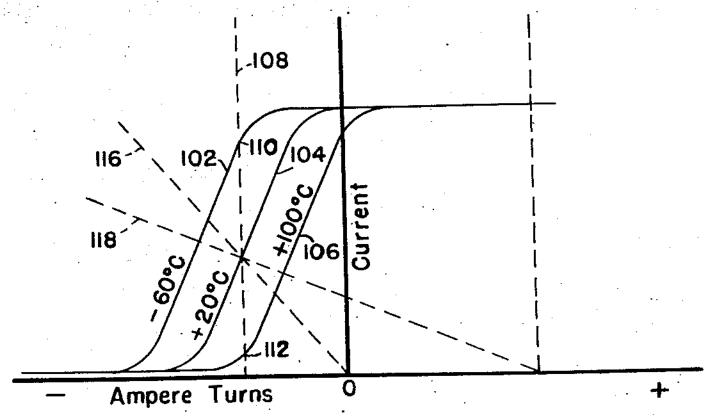

The operation of the apparatus illustrated in Fig. 1 can be better understood by referring to Figs. 2 and 3. For instance, in Fig. 2 a curve 90 represents the control characteristic for the section 14 of the magnetic amplifier 10 for a given bias and temperature of the air surrounding the amplifier 10, and a curve 92 represents the control characteristic for the section 12 of the amplifier 10 for a given bias and temperature. As illustrated in Fig. 2, the sections 12 and 14 are biased to the half maximum output point, at which point the greatest range of linear output current from the push-pull magnetic amplifier 10 is obtained. When biased to this half maximum output point, the linear output current from the magnetic amplifier 10 is represented by a curve 94 which is the difference at any point between the curves 92 and 90.

As hereinbefore mentioned, the curves 90 and 92 as illustrated in Fig. 2 are the control characteristic curves for the sections 12 and 14 of the magnetic amplifier 10 when the temperature of the air surrounding the amplifier 10 is at a given value. However, assuming the temperature of the air surrounding the magnetic amplifier 10 increases, the curve 90 will shift to a new position represented by a curve 96, and the curve 92 will shift to a new position as represented by a curve 98. Such an increase in temperature of the air surrounding the amplifier 10 decreases the range of linear output current from the magnetic amplifier 10 unless the self-bias windings 50, 52, 54 and 56 are provided. Such a decreased linear range of output current from the magnetic amplifier 10 when it is not provided with the self-bias windings 50, 52, 54 and 56 is illustrated by a curve 100.

By providing the self-bias windings 50, 52, 54 and 56, the curve 96 is shifted to the left until it nearly assumes the position represented by the curve 90 and the curve 98 is shifted to the right until it nearly assumes the position of the curve 92. The reason for this is that when the curve 90 shifts to the right and the curve 92 shifts to the left due to an increase in the temperature of the air surrounding the amplifier 10, the magnitude of the sum of the output currents from the sections 12 and 14 of the amplifier 10 decreases to thereby decrease the current flow through the self-bias windings 50, 52, 54 and 56 and thus decrease the negative bias applied to the amplifier 10, thereby effecting a shift of the curve 96 to the left and a shift of the curve 98 to the right.

If the temperature of the air surrounding the amplifier 10 decreases, the curve 90 will shift to the left and the curve 92 will shift to the right thereby increasing the sum of the output currents from the sections 12 and 14 of the amplifier 10. With an increase in the sum of these output currents, the negative bias as exerted by the self-bias windings 50, 52, 54 and 56 is increased to thereby effect a return of the curve 90 to substantially the position as illustrated in Fig. 2 and a return of the curve 92 to a position substantially as illustrated in Fig. 2.

The effect of providing in addition to the self-bias windings 50, 52, 54 and 56 the external-bias windings 74, 76, 78 and 80 can be better understood by referring to Fig. 3. In Fig. 3, curves 102, 104 and 106 are the control characteristic curves for the section 14 of the magnetic amplifier 10 when the temperature of the air surrounding the amplifier 10 is at −60° C., +20° C., +100° C., respectively. Assuming the normal temperature of the air surrounding the amplifier 10 is 20° C., and the amplifier 10 is not provided with the self-bias windings 50, 52, 54 and 56, and with the external-bias windings 74, 76, 78 and 80, but rather is provided with negative bias windings (not shown) which bias the section 14 of the amplifier 10 to the half maximum output point, then the locus of operation for all temperatures will lie along the dotted vertical line 108. If the temperature of the air surrounding the amplifier 10 decreases to −60° C., the operating point for the section 14 of the amplifier 10 would be at the point 110. On the other hand, if the temperature of the air surrounding the amplifier 10 increases to 100° C., the operating point for the section 14 of the amplifier 10 would be at 112. Such being the case, the linear operating range of the amplifier 10 is greatly decreased with either a decrease or increase in the temperature of the air surrounding the amplifier 10 when only a negative bias is provided for the section 14, since with an increase or decrease in the temperature from its normal value, the section 14 is not biased to one half its maximum output.

On the other hand, when in accordance with the teachings of this invention only the self-bias windings 50, 52, 54 and 56 are provided for biasing purposes, and the self-bias windings 50, 52, 54 and 56 are so chosen that the operating point is at one-half maximum output for the section 14 at 20° C., the locus of operation for all temperatures will then lie along the dotted line 116 drawn between the origin and the operating point at 20° C. As can be seen from Fig. 3 by providing the self-bias windings 50, 52, 54 and 56 the operating point does not deviate nearly as far from the point of one-half maximum output with changes in the temperature of the air surrounding section 14 of the amplifier 10. Thus, a greater linear range of output current for the amplifier 10 is obtained by providing the self-bias windings 50, 52, 54 and 56.

As hereinbefore mentioned, a further improvement in temperature compensation can be obtained by providing in addition to the self-bias windings 50, 52, 54 and 56, the external-bias windings 74, 76, 78 and 80. When the external-bias windings 74, 76, 78 and 80 and the self-bias windings 50, 52, 54 and 56 are provided, the locus of operation for all temperatures lies along the dotted line 118. As can be seen from Fig. 3, the operating point for the section 14 of the amplifier 10 deviates even less from the one-half maximum output point with changes in temperature when both the self-bias windings 50, 52, 54, 56 and the external-bias windings 74, 76, 78 and 80 are provided. Of course, when the positive bias is provided by the external-bias windings 74, 76, 78 and 80, the number of negative ampere turns provided by the self-bias windings 50, 52, 54 and 56 must be increased in order to overcome the positive ampere turns provided by the external-bias windings. However, since the number of negative ampere turns provided by the self-bias windings 50, 52, 54 and 56 must be increased accordingly, there is a practical limit to the amount of positive bias that should be provided by the external-bias windings 74, 76, 78 and 80.

The operation of the apparatus of Fig. 1 will now be briefly described. Assuming the right end of the secondary winding 20 of the transformer 16 as illustrated in Fig. 1 is at a positive polarity, current flows from this end through the load winding 42 of the section 14, the rectifier 46, the load resistor 60, the self-bias windings 52, 50, 56 and 54 to the tap 22 on the secondary winding 20. When the right end of the secondary winding 20 of the transformer 16 is at a postive potential, current also flows through the load winding 30 of the section 12, the rectifier 34, the load resistor 58, and the self-bias windings 52, 50, 56 and 54 to the tap 22 on the secondary winding 20. On the other hand, during the next half-cycle of the alternating current as applied to the transformer 16 when the left end of the secondary winding 20 as illustrated in Fig. 1, is at a positive potential current flows from this end of the secondary winding 20 through the load winding 28 of the section 12, the rectifier 32, the load resistor 58 and the self-bias windings 52, 50, 56 and 54 to the tap 22 on the secondary winding 20. During this same half-cycle of the alternating current applied to the transformer 16 current flows from the left end of the secondary winding 20 through the load winding 40 of the section 14, the rectifier 44, the load resistor 60 and the self-bias windings 52, 50, 56 and 54 to the tap 22 on the secondary winding 20 of the transformer 16.

If in operation the terminal 62 is at a positive potential with respect to the terminal 62′, current flows through the control windings 64, 66, 68 and 70 to thereby increase the magnetic saturation of the core members 24 and 26 and decrease the magnetic saturation of the core members 36 and 38, thus increasing the magnitude of the current flow through the load resistor 58 and decreasing the current flow through the resistor 60. Under such conditions, the output terminal 119 of the amplifier 10 will be at a positive potential with respect to the output terminal 119′. On the other hand, if the terminal 62′ is at a positive potential with respect to the terminal 62, current flows through the control windings 70, 68, 66 and 64 to thereby increase the magnetic saturation of the core members 36 and 38 and decrease the magnetic saturation of the core members 24 and 26 to thereby increase the magnitude of the current flow through the load resistor 60 and decrease magnitude of the current flow through the load resistor 58 thus rendering the output terminal 119′ at a positive potential with respect to the output terminal 119. Thus, by reversing the polarity of the direct-current control signal applied to the terminals 62 and 62′, the polarity of the output voltage of the magnetic amplifier 10 is reversed.

It is to be understood that although four rectangular core members 24, 26, 36 and 38, are shown for the apparatus of Fig. 1, two 3-legged magnetic core members could be utilized in place of the four rectangular core members shown.

The apparatus embodying the teachings of this invention has several advantages. For instance, the widest possible range of linear output current and thus output voltage can be secured from each of the push-pull magnetic amplifiers even though the temperature of the air surrounding each of the magnetic amplifiers changes over a considerable range. In addition, owing to such temperature compensation being provided, the sections of each of the push-pull magnetic amplifiers need not be identical and a certain amount of mismatch can exist.

Since certain changes may be made in the above apparatus and circuits and different embodiments of the invention may be made without departing from the scope thereof, it is intended that all matter contained in the above description or shown in the accompanying drawings shall be interpreted as illustrative and not in a limiting sense.

We claim as our invention:

1. In a push-pull magnetic amplifier, the combination comprising, two sections, each of the two sections of the push-pull magnetic amplifier including magnetic core means, two load windings disposed in inductive relationship with the magnetic core means, each load winding having a rectifier connected in series circuit relationship therewith for permitting current to flow in only one direction through the load windings, a self-bias winding disposed in inductive relationship with the magnetic core means, the self-bias windings of said two sections being connected in series circuit relationship with one another, and a control winding disposed in inductive relationship with the magnetic core means for receiving a reversible direct current signal, the control windings of said two sections being so interconnected and disposed on their respective magnetic core means that when current flows through the control windings one of said two sections is driven up and the other of said two sections is driven down, a transformer having a primary winding and a secondary winding having a tap intermediate its two ends, circuit means for connecting one end of said secondary winding to one end of one of the series connected load windings and rectifiers in each of said two sections and for connecting one end of the remaining series connected load windings and rectifiers of said two sections to the other end of said secondary winding, and other circuit means for connecting the series connected self-bias windings between the tap on the secondary winding and the other ends of the series connected load windings and rectifiers of said two sections so that the series connected self-bias windings are energized in accordance with the sum of the output currents from said two sections, the self-bias windings of said two sections being so interconnected and disposed as to produce a negative bias.

2. In a push-pull magnetic amplifier, the combination comprising, two sections, each of the two sections of the push-pull magnetic amplifier including two magnetic core members, a load winding disposed in inductive relationship with each of the magnetic core members, each load winding having a rectifier connected in series circuit relationship therewith for permitting current to flow in only one direction through the load windings, a self-bias winding disposed in inductive relationship with each of the magnetic core members, the self-bias windings of said two sections being connected in series circuit relationship with one another, and a control winding disposed in inductive relationship with each of the magnetic core members, the control windings of said two sections being so interconnected and disposed on their respective magnetic core members that when current flows through the control windings one of said two sections is driven up and the other of said two sections is driven down, a transformer having a primary winding and a secondary winding having a tap intermediate its two ends, circuit means for connecting one end of said secondary winding to one end of one of the series connected load windings and rectifiers in each of said two sections and for connecting one end of the remaining series connected load windings and rectifiers of said two sections to the other end of said secondary winding, and other circuit means for connecting the series connected self-bias windings between the tap on the secondary winding and the other ends of the series connected load windings and rectifiers of said two sections so that the series connected self-bias windings are energized in accordance with the sum of the output currents from said two sections, the self-bias windings of said two sections being so interconnected and disposed as to produce a negative bias.

References Cited in the file of this patent

UNITED STATES PATENTS

| | | |
|---|---|---|
| 2,464,639 | Fitz Gerald | Mar. 15, 1949 |
| 2,475,575 | Tweedy | July 5, 1949 |
| 2,657,281 | Kluz | Oct. 27, 1953 |
| 2,730,575 | Belsey | Jan. 10, 1956 |
| 2,752,429 | Hanson | June 26, 1956 |